(12) United States Patent
Xu et al.

(10) Patent No.: US 11,833,661 B2
(45) Date of Patent: Dec. 5, 2023

(54) UTILIZING PAST CONTACT PHYSICS IN ROBOTIC MANIPULATION (E.G., PUSHING) OF AN OBJECT

(71) Applicant: GOOGLE LLC, Mountain View, CA (US)

(72) Inventors: Zhuo Xu, Menlo Park, CA (US);
Wenhao Yu, Sunnyvale, CA (US);
Alexander Herzog, San Jose, CA (US);
Wenlong Lu, Sunnyvale, CA (US);
Chuyuan Fu, Sunnyvale, CA (US);
Yunfei Bai, Fremont, CA (US); C. Karen Liu, Stanford, CA (US); Daniel Ho, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 196 days.

(21) Appl. No.: 17/515,490

(22) Filed: Oct. 31, 2021

(65) Prior Publication Data
US 2022/0134546 A1    May 5, 2022

Related U.S. Application Data

(60) Provisional application No. 63/108,317, filed on Oct. 31, 2020.

(51) Int. Cl.
*B25J 9/16* (2006.01)
*B25J 13/08* (2006.01)
*B25J 19/02* (2006.01)

(52) U.S. Cl.
CPC ............ *B25J 9/163* (2013.01); *B25J 9/161* (2013.01); *B25J 9/1697* (2013.01); *B25J 13/085* (2013.01); *B25J 19/023* (2013.01)

(58) Field of Classification Search
CPC . B25J 9/163; B25J 9/161; B25J 9/1697; B25J 13/085; B25J 19/023; B25J 9/1664;
(Continued)

(56) References Cited

U.S. PATENT DOCUMENTS 6,775,415 B1 * 8/2004 Clausen ................. H04N 19/99
375/E7.204
8,879,831 B2 * 11/2014 Kohli ................... G06V 10/426
382/153

(Continued)

OTHER PUBLICATIONS

Levine, S. et al. "End-to-End Training of Deep Visuomotor Policies;" Journal of Machine Learning Research, 17; 40 pages; Apr. 2016.

(Continued)

*Primary Examiner* — Jaime Figueroa
(74) *Attorney, Agent, or Firm* — Gray Ice Higdon (57) ABSTRACT

Utilization of past dynamics sample(s), that reflect past contact physics information, in training and/or utilizing a neural network model. The neural network model represents a learned value function (e.g., a Q-value function) and that, when trained, can be used in selecting a sequence of robotic actions to implement in robotic manipulation (e.g., pushing) of an object by a robot. In various implementations, a past dynamics sample for an episode of robotic manipulation can include at least two past images from the episode, as well as one or more past force sensor readings that temporally correspond to the past images from the episode.

20 Claims, 7 Drawing Sheets

(58) Field of Classification Search
CPC ........... G05B 2219/39529; G05B 2219/40571; G05B 2219/40607
USPC ................. 318/568.11–568.25; 700/245–264
See application file for complete search history.

(56) References Cited

U.S. PATENT DOCUMENTS

| | | | |
|---|---|---|---|
| 9,555,544 B2* | 1/2017 | Bataller | B25J 9/1679 |
| 9,889,564 B2* | 2/2018 | Cronie | B25J 9/1669 |
| 9,943,225 B1* | 4/2018 | Chakravorty | A61B 5/7275 |
| 10,098,533 B2* | 10/2018 | Chakravorty | G06V 40/193 |
| 10,643,130 B2* | 5/2020 | Fidler | G06N 3/084 |
| 10,926,408 B1* | 2/2021 | Vogelsong | B25J 9/1671 |
| 11,030,766 B2* | 6/2021 | Choi | G06T 7/97 |
| 11,179,852 B2* | 11/2021 | Choi | B25J 11/008 |
| 11,250,583 B2* | 2/2022 | Suzuki | G06N 3/084 |
| 11,281,936 B2* | 3/2022 | Ma | G06F 18/23213 |
| 11,430,308 B1* | 8/2022 | Zhang | G08B 6/00 |
| 11,521,396 B1* | 12/2022 | Jain | G06N 7/01 |
| 11,538,143 B2* | 12/2022 | Song | G06F 18/22 |
| 11,556,797 B2* | 1/2023 | Fidler | G06N 20/00 |
| 11,592,829 B2* | 2/2023 | Kobayashi | G05D 1/0238 |
| 2018/0084988 A1* | 3/2018 | Chakravorty | A61B 5/7275 |
| 2018/0116498 A1* | 5/2018 | Chakravorty | G06V 40/193 |
| 2020/0061811 A1* | 2/2020 | Iqbal | G06N 3/08 |
| 2020/0114506 A1* | 4/2020 | Toshev | B25J 9/163 |
| 2020/0134804 A1* | 4/2020 | Song | G06V 10/764 |
| 2020/0152289 A1* | 5/2020 | Cleary | G16B 25/10 |
| 2020/0164517 A1* | 5/2020 | Dick | B25J 9/1697 |
| 2020/0206920 A1* | 7/2020 | Ma | G06F 18/23213 |
| 2020/0210964 A1* | 7/2020 | Monovich | G06Q 10/063118 |
| 2020/0306980 A1* | 10/2020 | Choi | B25J 9/1697 |
| 2020/0311956 A1* | 10/2020 | Choi | G06V 10/454 |
| 2020/0387162 A1* | 12/2020 | Kobayashi | G05D 1/0272 |
| 2021/0118289 A1* | 4/2021 | Jeevan | B60W 60/00276 |
| 2021/0237266 A1* | 8/2021 | Kalashnikov | B25J 9/1602 |
| 2022/0171988 A1* | 6/2022 | Ma | G06Q 10/06398 |

OTHER PUBLICATIONS

Kalashnikov, Dmitry, et al. "QT-Opt: Scalable Deep Reinforcement Learning for Vision-Based Robotic Manipulation." arXiv:1806.10293v3 [cs.LG] Nov. 28, 2018; 23 pages Nov. 28, 2018.
Rajeswaran, A. et al., "EPOpt: Learning Robust Neural Network Policies Using Model Ensembles;" Cornell University, arXiv.org, arXiv:1610.01283v3; 14 pages, Dec. 16, 2016.
Chebotar, Y. et al., "Closing the Sim-to-Real Loop: Adapting Simulation Randomization with Real World Experience;" In 2019 International Conference on Robotics and Automation (ICRA), pp. 8973-8979, IEEE, 2019.
Yu, W. et al., "Preparing for the unknown: Learning a universal policy with online system identification;" Cornell University, arXiv.org, arXiv:1702.02453v3; 10 pages; May 15, 2017.
Coumans, E., et al.; Pybullet, aPython Module for Physics Simulation, Games, Robotics and Machine Learning; http://pybullet.org/; dated 2016.
Van Der Maaten et al., "Visualizing Data using t-SNE" Journal of Machine Learning Research 9 (2008) 2479-2605; 27 pages; 2008.
Lee, J. et al., "Learning Quadrupedal Locomotion Over Challenging Terrain," Science Robotics, vol. 5, No. 47; 22 pages; dated 2020.
Zhou, J. et al., "A Convex Polynomial Force-Motion Model for Planar Sliding: Identification and Application," in 2016 IEEE International Conference on Robotics and Automation (ICRA), pp. 372-377, dated 2016.
Li, J.K. et al., "Push-net: Deep Planar Pushing for Objects with Unknown Physical Properties," in Robotics: Science and Systems, vol. 14, pp. 1-9, dated 2018.
Peng, X.B. et al., "Sim-to-Real Transfer of Robotic Control with Dynamics Randomization," in 2018 IEEE International Conference on Robotics and Automation (ICRA), pp. 1-8, dated 2018.
Rakelly, K. et al., "Efficient Policy Meta-Reinforcement Learning Via Probabilistic Context Variables," in International Conference on Machine Learning; 10 pages; dated 2019.
Xu, Z. et al., "Zero-Shot Deep Reinforcement Learning Driving Policy Transfer for Autonomous Vehicles Based on Robust Control," in 21st International Conference on Intelligent Transportation Systems (ITSC), IEEE, pp. 2865-2871, dated 2018.
Tang, C. et al., "Disturbance-Observer-Based Tracking Controller for Neural Network Driving Policy Transfer," Transactions on Intelligent Transportation Systems, IEEE, 12 pages; dated 2020.
Stuber, J. et al., "Let's Push Things Forward: A Survey on Robot Pushing," Frontiers in Robotics and AI, vol. 7, 18 pages; dated Feb. 6, 2020.
Mason, M.T., "Mechanics and Planning of Manipulator Pushing Operations," The International Journal of Robotics Research, vol. 5, No. 3, pp. 53-71, dated 1986.
Yu, K-T et al., "More than a million ways to be pushed. A high-fidelity experimental dataset of planar pushing," in IEEE/RSJ International Conference on Intelligent Robots and Systems (IROS), pp. 30-37, dated 2016.
Bauza, M. et al., "A Probabilistic Data-Driven Model for Planar Pushing," in IEEE International Conference on Robotics and Automation (ICRA), IEEE, pp. 3008-3015, dated 2017.
Ajay, A. et al. "Augmenting Physical Simulators with Stochastic Neural Networks: Case Study of Planar Pushing and Bouncing," in 2018 IEEE/RSJ International Conference on Intelligent Robots and Systems (IROS); pp. 3066-3073; dated Oct. 2018.
Xu, Z. et al., "DensePhysNet: Learning Dense Physical Object Representations via Multi-step Dynamic Interactions;" arXiv.org, arXiv:1906.03853v2; 10 pages; dated Jun. 11, 2019.
Stuber, J. et al. "Feature-Based Transfer Learning for Robotic Push Manipulation," in IEEE International Conference on Robotics and Automation (ICRA); 8 pages; dated May 2018.
Byravan, A. et al., "SE3-nets: Learning Rigid Body Motion Using Deep Neural Networks," in IEEE International Conference on Robotics and Automation (ICRA); pp. 173-180; dated 2017.
Ridge, B. et al., "Self-Supervised Online Learning of Basic Object Push Affordances," International Journal of Advanced Robotic Systems; vol. 12, No. 3, 19 pages; dated 2015.
Zhu, S. et al., "Information-theoretic Model Identification and Policy Search using Physics Engines with Application to Robotic Manipulation," arXiv.org, arXiv:1703.07822v1; 7 pages; dated Mar. 22, 2017.
Kopicki, M. et al., "Learning Modular and Transferable Forward Models of The Motions of Push Manipulated Objects," Autonomous Robots, vol. 41, No. 5, pp. 1061-1082, dated 2017.
Bodnar, C. et al., "Quantile QT-Opt for Risk-Aware Vision-Based Robotic Grasping," arXiv.org, arXiv:1910.02787v1; 8 pages; dated Oct. 1, 2019.
Ho, D. et al., "RetinaGAN: An Object-aware Approach to Sim-to-Real Transfer;" arXiv.org, arXiv:2011.03148v1; 9 pages; dated Nov. 6, 2020.

* cited by examiner

UTILIZING PAST CONTACT PHYSICS IN ROBOTIC MANIPULATION (E.G., PUSHING) OF AN OBJECT

BACKGROUND

Techniques have been proposed for utilizing reinforcement learning to train a policy network (e.g., a trained neural network model approximating a Q-function or other state-action value function) that, when trained, can be utilized by a robot in performing a robotic task, such as grasping, in which the robot interacts with one or more environmental objects.

In performing the robotic task, the trained policy network can be used to process state-action pairs that each include current vision data (e.g., a red, blue, green (RGB) image), along with a corresponding one of N sampled candidate robotic actions (e.g., sampled using the cross-entropy method (CEM) and/or other technique(s)). The candidate actions can be represented as a vector in task-space. For example, a candidate end effector action can be represented as a vector with five values, three of which define a three-dimensional (3D) translation of the end effector, and two values representing a sine-cosine encoding of the change in orientation of the end effector about an axis of the end effector. A corresponding value is generated for each of the sampled candidate actions based on the processing of the sampled candidate action and the robot state data. The candidate action corresponding to the best generated value can be selected for implementation by the robot. Upon completion of implementing the candidate action, the process can then be repeated to select a next candidate action to be implemented by the robot. This can continue until, for example, a termination condition is encountered, thereby enabling a sequence of actions to be sequentially selected and sequentially implemented in performing the robotic task.

SUMMARY

Implementations disclosed herein are directed to utilization of past dynamics sample(s), that reflect past contact physics information, in training and/or utilizing a neural network model. The neural network model represents a learned value function (e.g., a Q-value function) and, when trained, can be used in selecting a sequence of robotic actions to implement in robotic manipulation (e.g., pushing) of an object. In various implementations, a past dynamics sample for an episode of robotic manipulation can include at least two past images from the episode, as well as one or more past force sensor readings that temporally correspond to the past images from the episode. For example, a past dynamics sample can include two past images from the episode, as well as past force sensor reading(s) captured at or near (e.g., within 0.5 seconds of) an earlier in time (i.e., captured at a more distant time in the past) of the two past images. The two past images can be consecutive images or can otherwise be captured in close temporal proximity relative to one another (e.g., captured within 1.0 second, within 0.5 seconds, or other temporal threshold relative to one another). The two past images are captured by a vision component viewing an environment of the robot (e.g., a vision component coupled to the robot) and can capture the object and optionally component(s) of the robot (e.g., at least an end effector thereof). The past force sensor reading(s) can be, for example, a past force sensor reading from a force torque sensor at a wrist of the robot (e.g., at a base of the end effector).

When the past dynamic samples capture active manipulation of an object (e.g., applying force to push the object), the past dynamics sample(s) can serve as proxies of a pre-impact object state, an impact value, and a post-impact object state. More particularly, the earlier in time past image of a past dynamics sample can reflect the pre-impact object state, the past force sensor reading can reflect the impact value applied by the robot to the object, and the later in time past image can reflect the post-impact object state. Accordingly, the dynamics sample(s) can reflect one or more dynamics properties of the object, such as mass of the object and/or friction of the object. As one particular example, assume the robot is pushing a cup of water. The force sensor reading and the later in time of the past images, of a dynamics sample when the cup of water has a mass of 0.1 kg and a friction coefficient of 0.5, would be very distinct from the force sensor reading and the later in time of the past images if the cup of water instead had a mass of 0.8 kg and a friction coefficient of 1.0.

In generating a value for a candidate robotic action, implementations disclosed herein process the past dynamics sample(s) utilizing the neural network model, and process the dynamics samples along with at least the candidate robotic action and a current image. In these and other manners, the past dynamics sample(s) are taken into account in generating the value for a candidate robotic action, which affects which robot actions are selected in manipulating the object.

Since the past dynamics sample(s) indirectly reflect one or more dynamic properties of the object, this enables dynamics of the object to effectively be taken into account in determining a value of a candidate robotic action in performing a desired manipulation of an object. For example, when pushing an object across a surface, consideration of the dynamics samples enables effectively taking into account the mass and/or friction coefficient of the object. Accordingly, which candidate action is selected at each iteration, which is based on corresponding generated values for considered candidate actions, can be dependent on dynamic properties of the object. For example, differing dynamic properties of the object can result in selection of differing action(s) that result in different contact points of an end effector with the object and/or that result in differing maximum torques being utilized in the action(s).

As described herein, the neural network model utilized in generating the values can be trained using reinforcement learning based on past training episodes of pushing objects. Moreover, the reward function utilized in the training can reward successful pushing to a target location and/or minimal (or no) deflection of a vertical axis of the object during pushing. Accordingly, candidate robot actions can be selected that enable successful pushing to a target location, while mitigating deflection of the vertical axis of the object (e.g., tipping over of the object in an extreme case). In these and other manners, for two different objects that are visually the same but that have very different masses and/or friction coefficients, differing values can be generated for the same candidate actions when the dynamics samples are taken into account—and are selected to enable successful pushing of the object to a target location, while mitigating deflection of the vertical axis of the object.

In some implementations, past dynamics sample(s) are utilized in selecting a sequence of robotic actions for pushing of an object, by a robot, to a target location. In some of those implementations, at each of multiple iterations, a current image is captured by a vision component of the robot. The vision component can be for example, a monographic camera (e.g., generating 2D RGB images), a stereographic camera (e.g., generating 2.5D RGB-D images), and/or a laser scanner (e.g., generating a 2.5D depth (D) image). Further, at each of multiple iterations, a plurality of initial candidate actions can be determined by, for example, sampling of candidate actions from an action space, such as uniform sampling within the action space. A state-action encoding for each of the initial candidate actions can be generated by processing the current image (optionally stacked with an initial image from the beginning of the episode) and a corresponding one of the initial candidate actions using a state-action tower of the neural network.

Optionally, low-dimension state data is also processed using the state-action tower, such as low-dimension state data that indicates a current height of an end effector of the robot and/or that indicates whether (and/or to what extent) digits of the end effector are closed. Also, when the target location is not already delineated by the current image or initial image (e.g., a red dot or other target identifier in the image), the current image or initial image (or stack thereof) can optionally be modified to delineate the target location. The target location can be one defined based on user interface input (e.g., a user directing the target location) or by a higher-level task planner of the robot (e.g., a task planner defining the target location of a cup as part of a higher-level task of setting a table). As one example of modifying the image to delineate the target location, pixel(s) of one or more existing channel(s) of the image can be set to certain value(s) that reflect that those pixel(s) correspond to the target location. As another example, an extra channel can be added to the current image or the initial image (or stack thereof), and pixel(s) of that extra channel can be set to certain value(s) that reflect that those pixel(s) correspond to the target location. In other words, the image(s) can be modified to include value(s), for certain pixels, where by having the value(s) the certain pixels indicate the target location in the vision frame. The pixels that are not the certain pixels can have alternate value(s) that indicate they do not correspond to the target location.

At each of the multiple iterations, past dynamics sample(s), if any, are also identified. For example, multiple past dynamics samples can be identified by uniformly sampling corresponding past data from the last three seconds, two seconds, one second, or other duration. As another example, multiple past dynamics samples can be identified by uniformly sampling corresponding data from the last X duration, but only for the corresponding data that indicates past force sensor readings that satisfy a threshold. For example, satisfying the threshold can be being greater than or equal to the threshold and the threshold can be 0.5 Newton, 1.0 Newton or other threshold that indicates the robot is likely in contact with the object to be pushed.

A dynamics encoding for each of the dynamics samples can be generated by processing a corresponding dynamics sample (e.g., a pair of images and a force sensor reading) using a dynamics tower of the neural network model. Each generated dynamics encoding encodes rich contact physics information, reflected by a corresponding dynamics sample, into a lower dimensional latent context representation.

A value for each of the initial candidate actions can then be determined by processing, using additional layer(s) of the neural network model, (a) the state-action encoding for the initial candidate action and (b) the dynamics encoding(s). For example, multiple generated dynamics encodings can be averaged to generate an average dynamics encoding, and the average dynamics encoding and the state-action encoding can be processed, using the additional layer(s), to generate a value for an initial candidate action.

If any of the values satisfies a threshold (e.g., a fixed threshold), the initial candidate action corresponding to that value can then be used to control the robot (e.g., by causing the robot to implement the initial candidate action). However, if none of the initial values satisfies the threshold, then one or more of the best (e.g., closest to the threshold) values can be identified, and corresponding initial candidate action(s) used in sampling additional candidate actions. For example, the additional candidate actions can be sampled from a Gaussian distribution around one of the corresponding candidate action(s) having the best value(s). The additional candidate actions can then be used in generating additional state-action encodings using the state-action tower. Further, a value for each of the additional candidate actions can then be determined by processing, using the additional layer(s) of the neural network model, (a) the additional state-action encoding for the additional candidate action and (b) the dynamics encoding(s). If any of those values satisfies the threshold, the initial candidate action corresponding to that value can then be used to control the robot. However, if none of the additional values satisfies the threshold, then one or more of the best (e.g., closest to the threshold) values can be identified, and utilized in sampling yet additional candidate actions. This can be repeated until a value that satisfies the threshold is determined, or other condition(s) are met (at which point the robotic task may fail, or a "best" value, that still doesn't satisfy the threshold, can be used).

In some implementations, training the neural network model can be based on reinforcement learning that is based on simulated and/or real robotic training episodes in which the robotic manipulation is attempted. In some of those implementations, Q-learning techniques can be utilized, such as QT-opt, Q2-Opt, or other continuous action variant of Q-learning. As one example, where the robotic manipulation is pushing, pushing training episodes can be performed in simulation. In each episode, a corresponding simulated object is placed in the simulated environment and a target location placed in the simulated environment (e.g., with a simulated red dot or through modifying simulated image(s) as described above). The placement of the simulated object and/or the target location can be random (pseudo-random or truly random) and can optionally be constrained to placement on one or more simulated surfaces in the environment. The simulated object can be selected from amongst a corpus of simulated objects, providing variation of objects amongst episodes. Further, a simulated mass and/or simulated friction coefficient can be selected (e.g., randomly) from a range of valid masses and/or friction coefficients (e.g., those that are within the torque limits of the simulated robot or a corresponding real robot).

A large quantity (e.g., 50,000; 100,000; 500,000; or more) reinforcement learning episodes can be performed in simulation using scripted movements or partially trained versions of the neural network model described herein, and/or other techniques. The scripted movements can optionally be performed in initial episodes and corresponding data utilized to initially train the neural network model. After the initial training or bootstrapping, iteratively updated partially trained versions of the neural network model can then be utilized in performing the simulated grasp training episodes. It is noted that QT-Opt, Q2-Opt, and other continuous action variants of Q-learning can be performed off-policy, which makes it possible to utilize, during training, states, actions, past dynamics samples, and rewards from the scripted episodes and/or from episodes performed using prior partially trained versions of the neural network model. The neural network model described herein can represent the learned Q-value function.

In some implementations of reinforcement learning, the reward function is a sparse binary reward function, optionally with a small penalty given at each time step to encourage faster execution of the pushing or other manipulation. In some of those implementations in which the manipulation is pushing, the reward function can have a value of 1 when, at the end of the episode, the distance between the simulated object and the target location is less than a threshold distance and, optionally, when the vertical axis of the object is not deflected greater than a threshold degree during the episode and/or when the object is not tipped over at the end of the episode (i.e., the vertical axis of the object is still vertical in the simulated environment). Non-binary reward functions can be used in other implementations, such as one that penalizes to a degree that is based on distance between the simulated object and the target location and/or that is based on a degree of deflection of the vertical axis of the simulated object during the episode.

Aspects of the previous example and some other examples herein are described with respect to a pushing manipulation. However, past dynamics samples can additionally or alternatively be utilized in association with grasping, placing, and/or other manipulations. Moreover, with those other manipulations, considering the past dynamics samples can, like with pushing, still lead to faster training of the neural network model and/or improved real world performance of the corresponding manipulation. For example, dynamics of the object being manipulated can be important in a grasping manipulation as grasp techniques that may work for low mass and/or low coefficient of friction objects may fail for high mass and/or high coefficient of friction objects.

The above description is provided as an overview of only some implementations disclosed herein. These and other implementations are described in more detail herein, including in the detailed description, the claims, and in the appended paper.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
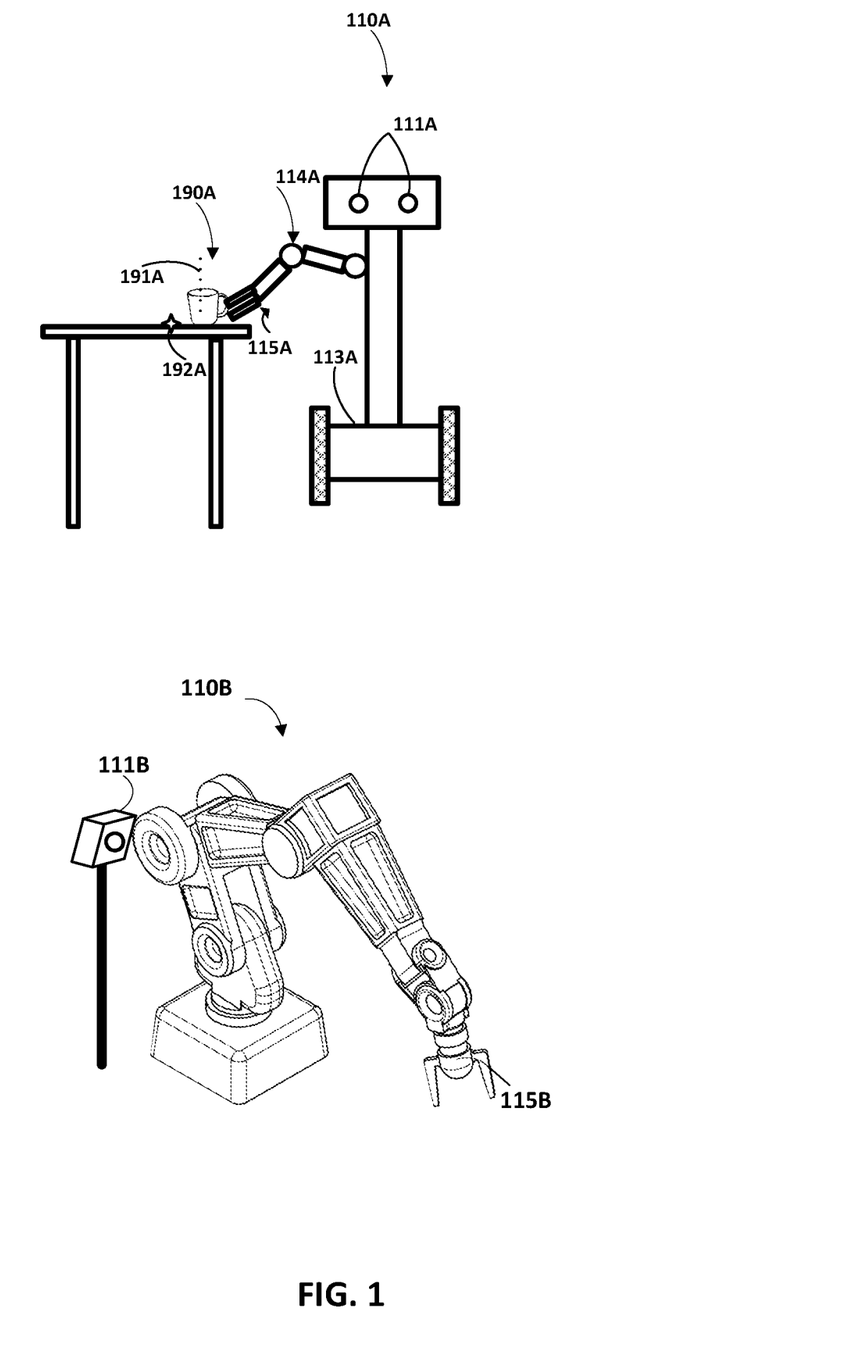
FIG. 1 illustrates an example environment in which implementations disclosed herein can be implemented.

FIG. 1 illustrates an example environment in which implementations disclosed herein can be implemented. The example environment includes a robot 110A, and a coffee mug 190A resting on a table. The example environment also includes another robot 110B. The example environment of FIG. 1 can be a real world environment in which robot 110A and/or 110B can utilize techniques described herein in manipulating the object 190A and other objects, such as pushing, grasping, or otherwise manipulating the objects. The example environment can alternatively be a real or simulated environment, in which robot 110A or 110B (or simulated versions thereof in the case of a simulated environment) can be utilized to perform manipulation training episodes to generate data for use in reinforcement learning of a neural network model according to implementations disclosed herein.

The robot 110A illustrated in FIG. 1 is a particular mobile robot. The robot 110B is a particular armed robot with a non-mobile base. However, additional and/or alternative robots can be utilized with techniques disclosed herein, such as additional robots that vary in one or more respects from robot 110A and/or robot 110B illustrated in FIG. 1. For example, a mobile forklift robot, an unmanned aerial vehicle ("UAV"), and/or a humanoid robot can be utilized instead, of or in addition to robot 110, in training or inference techniques described herein.

Robot 110A includes a base 113A with wheels provided on opposed sides thereof for locomotion of the robot 110A. The base 113A may include, for example, one or more motors for driving the wheels of the robot 110A to achieve a desired direction, velocity, and/or acceleration of movement for the robot 110A.

Robot 110A also includes a vision component 111A that can generate images related to shape, color, depth, and/or other features of object(s) that are in the line of sight of the vision component 111A. The vision component 111A may be, for example, a monocular camera, a stereographic camera (active or passive), and/or a 3D laser scanner. A 3D laser scanner may include one or more lasers that emit light and one or more sensors that collect data related to reflections of the emitted light. The 3D laser scanner may generate vision component data that is a 3D point cloud with each of the points of the 3D point cloud defining a position of a point of a surface in 3D space. A monocular camera may include a single sensor (e.g., a charge-coupled device (CCD)), and generate, based on physical properties sensed by the sensor, images that each includes a plurality of data points defining color values and/or grayscale values. For instance, the monocular camera may generate images that include red, blue, and/or green channels. Each channel may define a value for each of a plurality of pixels of the image such as a value from 0 to 255 for each of the pixels of the image. A stereographic camera may include two or more sensors, each at a different vantage point. In some of those implementations, the stereographic camera generates, based on characteristics sensed by the two sensors, images that each includes a plurality of data points defining depth values and color values and/or grayscale values. For example, the stereographic camera may generate images that include a depth channel and red, blue, and/or green channels.

Robot 110A also includes one or more processors that, for example: provide control commands to actuators and/or other operational components thereof; determine poses of objects based on vision component data and models of those objects; generate control commands for various tasks based at least in part on robotic actions determined utilizing neural network model as described herein; etc. For example, one or more processors of robot 110A may implement all or aspects of method 200 of FIG. 2. Additional description of some examples of the structure and functionality of various robots is provided herein.

The robot 110A also includes robot arm 114a with an end effector 115a that takes the form of a gripper with two opposing "fingers" or "digits." Also illustrated in FIG. 1, is a vertical axis 191A of the coffee mug 190A and a target location 192A, illustrated as a star. As described herein, in various implementations the manipulation for which the neural network model is trained is a pushing manipulation. In some of those implementations, the neural network model can be trained to generate values for candidate action(s) that, when implemented by robot 110A, are likely to lead to robot 110A interacting with coffee mug 190A to push it to the target location 192A. For example, the reward function utilized in reinforcement learning can reward state-action pairs of episodes that result in a corresponding object being within a threshold distance of a corresponding target location. In some of those implementations, the neural network model can additionally be trained to generate values for candidate action(s) that, when implemented by robot 110A, are likely to lead to robot 190A interacting with coffee mug 191A without it deflecting, or deflecting only minimally, from its vertical axis 191A. Put another way, if the coffee mug 190A was not deflected from its vertical axis 191A at all during the manipulation, the vertical axis 191A would continue to be vertically oriented (e.g., up/down in the view of FIG. 1) throughout the manipulation. On the other hand, if the coffee mug 190A was tipped over as a result of the manipulation, the vertical axis would be horizontally oriented instead of vertically oriented.

Robot 110B is another example robot via which techniques disclosed herein can be implemented. Robot 110B is a robot arm with seven degrees of freedom, and includes an end effector 115B. A vision component 111B is not directly attached to the robot 110B, but is communicatively coupled with the robot 110B. The vision component 111B captures images of a workspace of the robot 110B and provides those images to processor(s) of robot 110B for utilization in techniques described herein.

Figure 2:
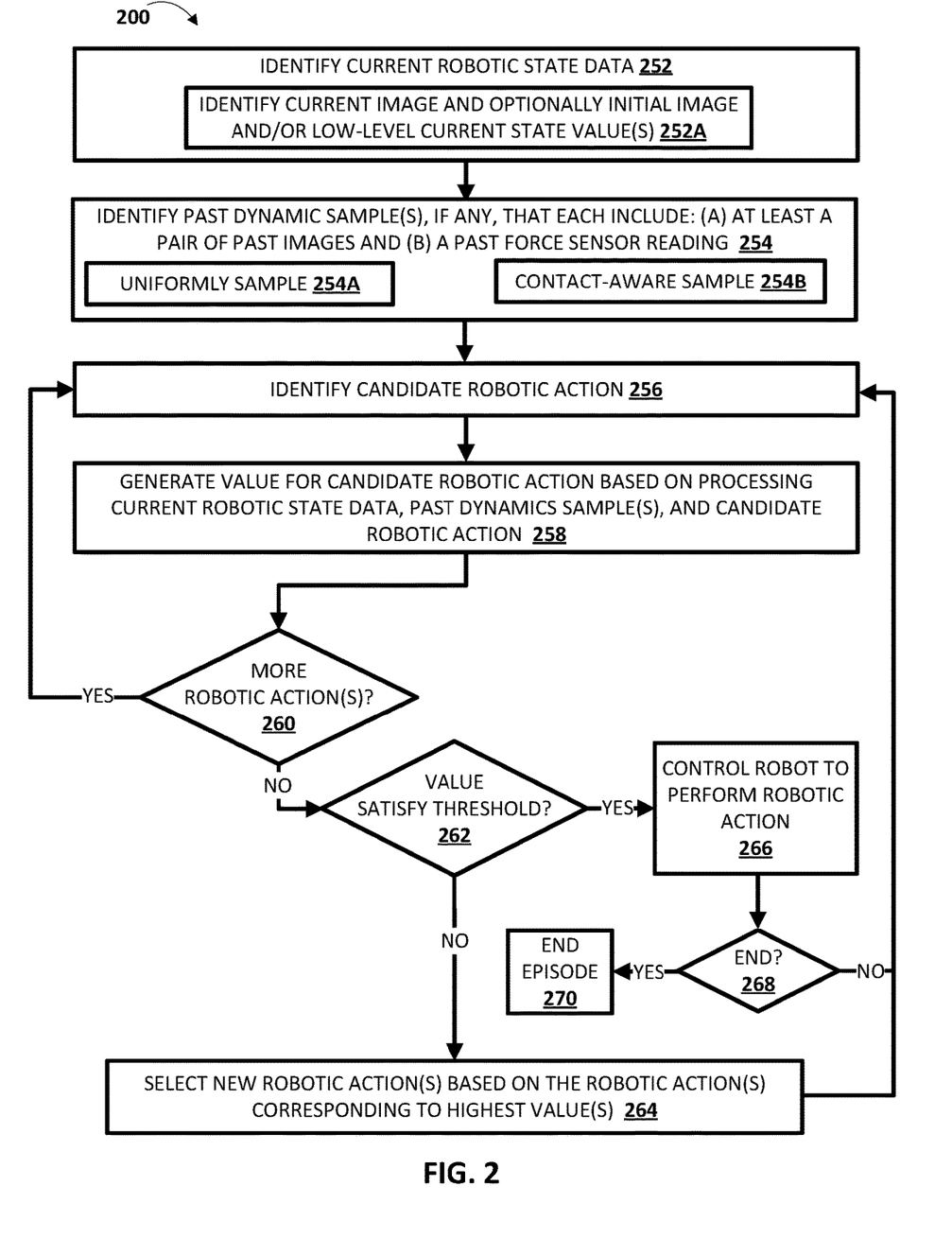
FIG. 2 is a flowchart illustrating an example method of performing a manipulation of an object based on processing of past dynamics samples.

Turning now to FIG. 2, a flowchart is illustrated of an example method 200 of performing a manipulation of an object based on processing of past dynamics samples. For convenience, the operations of the flowchart are described with reference to a system that performs the operations. This system may include one or more components of a robot, such as a processor and/or robot control system of robot 110A, robot 110B, robot 620, and/or other robot. Moreover, while operations of method 200 are shown in a particular order, this is not meant to be limiting. One or more operations may be reordered, omitted or added.

At block 252, the system identifies current robotic state data. In some implementations, block 252 includes sub-block 252A.

At sub-block 252A, the system identifies a current image of the current robotic state data, and optionally identifies an initial image and/or one or more low-level current state value(s) of the current state data. For example, the system can identify a current image, an initial image captured at the beginning of the episode (and optionally when an end effector was purposefully moved out of view of the vision component), and low-level current state values. The low-level current state values can include value(s) that indicate the current height of an end effector of the robot and/or value(s) that indicates whether (and/or to what extent) digits of the end effector are closed.

In some implementations where the manipulation is a pushing manipulation to a target location, the system can include, in the initial image, the current image, or a stacking of the initial and current images, a delineation of the target location. The target location can be one defined based on user interface input or by a higher-level task planner of the robot. As one example, the initial image can be modified to delineate the target location by setting pixel(s) thereof to certain value(s) that reflect that those pixel(s) correspond to the target location. As another example, an extra channel can be added to the stack of the initial image and the current image, and pixel(s) of that extra channel can be set to certain value(s) that reflect that those pixel(s) correspond to the target location.

In some implementations where the manipulation is instance grasping (grasping of a particular object), the system can include, in the initial image, the current image, or a stacking of the initial and current images, a delineation of the particular object to be grasped. The particular object to be grasped can be one defined based on user interface input or by a higher-level task planner of the robot. As one example, an extra channel can be added to the stack of the initial image and the current image, and pixel(s) of that extra channel can be set to certain value(s) that reflect that those pixel(s) correspond to the particular object to be grasped.

At block 254, the system identifies one or more past dynamics samples, if any. The past dynamics samples each include: (a) at least a pair of images and (b) a past force sensor reading (or multiple force sensor readings if multiple force sensors are included on the robot). The pair of images can be consecutive images (i.e., two images captured in succession by a corresponding vision component) or otherwise captured in close temporal proximity relative to one another. For example, they can be captured within 1.0 second, 0.5 seconds, or other temporal threshold relative to one another.

The past force sensor reading can be, for example, from a force sensor that measures force applied to an end effector of the robot (e.g., in response to the end effector contacting an object). The force sensor can be on, incorporated in, or indirectly coupled to, the end effector. In some implementations, the past force sensor reading temporally corresponds to an earlier in time of the images. For example, they may have the same timestamp, or slightly different timestamps (e.g., the frequency of capturing images can differ from the frequency of capture force sensor readings). In some implementations, the system identifies the force sensor reading, then identifies the earlier in time image based on a timestamp of the earlier in time image being temporally closest, amongst all past images, to a timestamp of the force sensor reading.

Figure 4A:
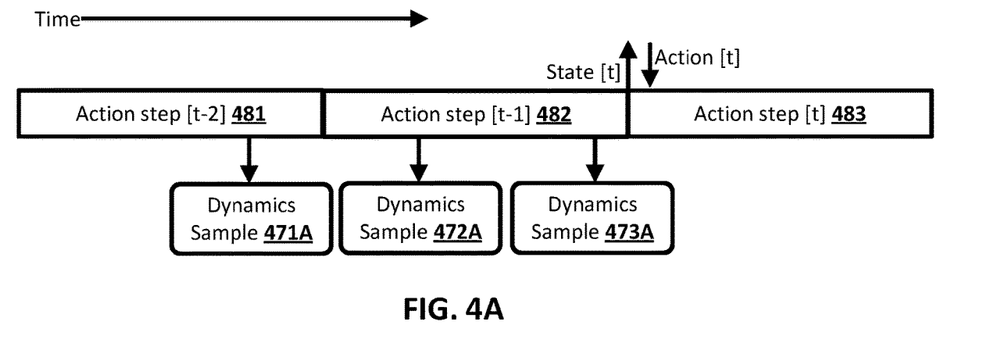
FIG. 4A illustrates an example of uniform sampling of past dynamics samples.

In some implementations, block 254 includes sub-block 254A or sub-block 254B. At sub-block 254A, the system uniformly samples in identifying the past dynamics samples. For example, the system can uniformly sample force sensor readings from the last three seconds, two seconds, one second, or other duration, and select N force readings from the uniform sampling. N is an integer such as two, three, or four. Further, for each selected force reading, the system can identify a dynamics sample by selecting an earlier in time past image that is temporally most proximal to the selected force reading, and a later in time past image that is the next in time past image or is later in time but within a threshold time of the earlier in time past image. FIG. 4A also illustrates an example of uniform sampling.

Figure 4B:
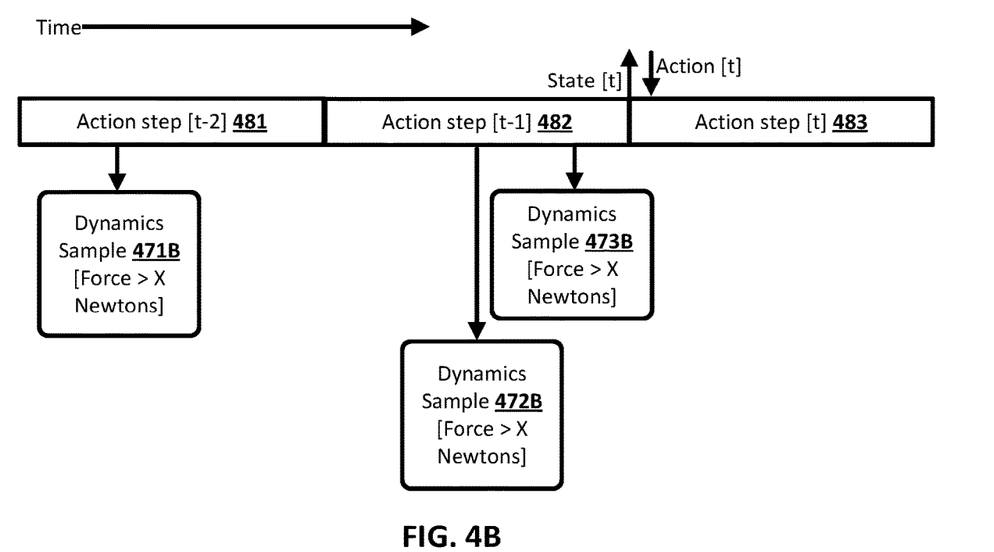
FIG. 4B illustrates an example of contact-aware sampling of past dynamics samples.

At sub-block 254B, the system contact-aware samples. In performing a contact-aware sampling, the system can optionally sample for the last X duration, but can restrict the sampling to only force readings that satisfy a force threshold. For example, the system can sample only from force readings that are greater than or equal to 0.5 Newton, 1.0 Newton or other threshold that indicates the robot is likely in contact with the object to be pushed. As one example, over the last 3 seconds 150 force sensor readings may have been taken and stored. However, of those, only 30 may be force readings that satisfy the threshold. Accordingly, with contact-aware sampling, the system can sample (uniformly or otherwise) only from those 30 that satisfy the threshold, and select N force readings from the sampling. Further, for each selected force reading, the system can identify a dynamics sample by selecting an earlier in time past image that is temporally most proximal to the selected force reading, and a later in time past image. FIG. 4B also illustrates an example of uniform sampling.

At block 256, the system identifies a candidate robotic action. For example, the candidate robotic action can be one of multiple actions identified by uniform sampling within an action space. The candidate robotic action can, in some implementations, define a pose change for a component of the robot, such as pose change, in Cartesian space, for a grasping end effector of the robot. The pose change can be defined by the candidate robotic action as, for example, a translation difference (indicating a desired change in position) and a rotation difference (indicating a desired change in azimuthal angle). The candidate robotic action can further include, for example, a maximum torque to be applied during performance of the candidate robotic action. Accordingly, a first candidate robotic action and a second candidate robotic action can define the same pose change, but define different maximum torques. The candidate robotic action can also optionally additionally or alternatively include a termination command that dictates whether to terminate performance of the episode. Accordingly, a candidate robotic action can also include an episode termination action.

At block 258, the system generates a value for the candidate robotic action based on processing the current robotic state data of block 252, the past dynamics sample(s) of block 254, and the candidate robotic action. In some implementations, the system processes the robotic state data and the candidate robotic action using a state-action tower of a neural network model to generate a state-action encoding. The system further processes the past dynamics sample(s) of block 254, in one or more iterations and using a dynamics tower of the neural network model, to generate dynamics encoding(s). The state-action encoding and dynamics encoding(s) can then be concatenated or otherwise combined, and processed over additional layer(s) of the neural network model to generate the value. For example, the dynamics encodings can be averaged or otherwise combined to generate a combined dynamics encoding. The combined dynamics encoding and the state-action encoding can then be processed, together, over additional layer(s) of the neural network model to generate the value.

At block 260, the system determines whether there are more candidate robotic action(s) for which to generate a corresponding value. For example, where multiple candidate robotic actions are sampled, a corresponding value can be generated for each of the candidate robotic actions. If the decision at block 260 is yes, the system proceeds back to block 256, identifies another candidate action, then generates a value for the other candidate action at block 258. It is noted that iterations of blocks 256 and 258 can optionally occur in parallel (i.e., multiple value for multiple candidate robotic actions generated in parallel).

At block 262, the system determines whether any one of the values generated at iterations of block 258 satisfies a threshold, such as a fixed threshold.

If, at an iteration of block 262, the system determines a given one of the values generated at block 258 satisfies the threshold, the system proceeds to block 266 and controls the robot to perform the robotic action. The system then proceeds to block 268 to determine if the episode of manipulation should end. The system can determine the episode should end if, for example, the robotic action indicated a termination condition or if it is determined, from analyzing sensor data after performing the robotic action, that the manipulation has been successfully performed. If, at block 268, the system determines the episode should end, the system proceeds to block 270 and ends the episode. If, at block 268, the system determines the episode should not end, the system proceeds back to block 256 in determining the next robotic action to implement in the episode.

If, at an iteration of block 262, the system determines none of the corresponding values generated at block 258 satisfy the threshold, the system proceeds to block 264. At block 264, the system selects one or more new robotic actions based on the robotic action(s) corresponding to the highest (in implementations where "higher"="better") values generated at block 258. For example, the system can select one or more new robotic actions based on sampling additional new robotic actions that are near, in action space, to the robotic action(s) corresponding to the highest value (s). The system then returns to block 256. This can repeat until block 266 is encountered in an iteration, or until other condition(s) are met. For example, the other condition(s) can include performance of at least a threshold quantity of iterations of block 262 of FIG. 2B, at which point the considered pose corresponding to the best value can be selected and used in performing the task, despite not satisfying the threshold considered in block 262.

Figure 3:
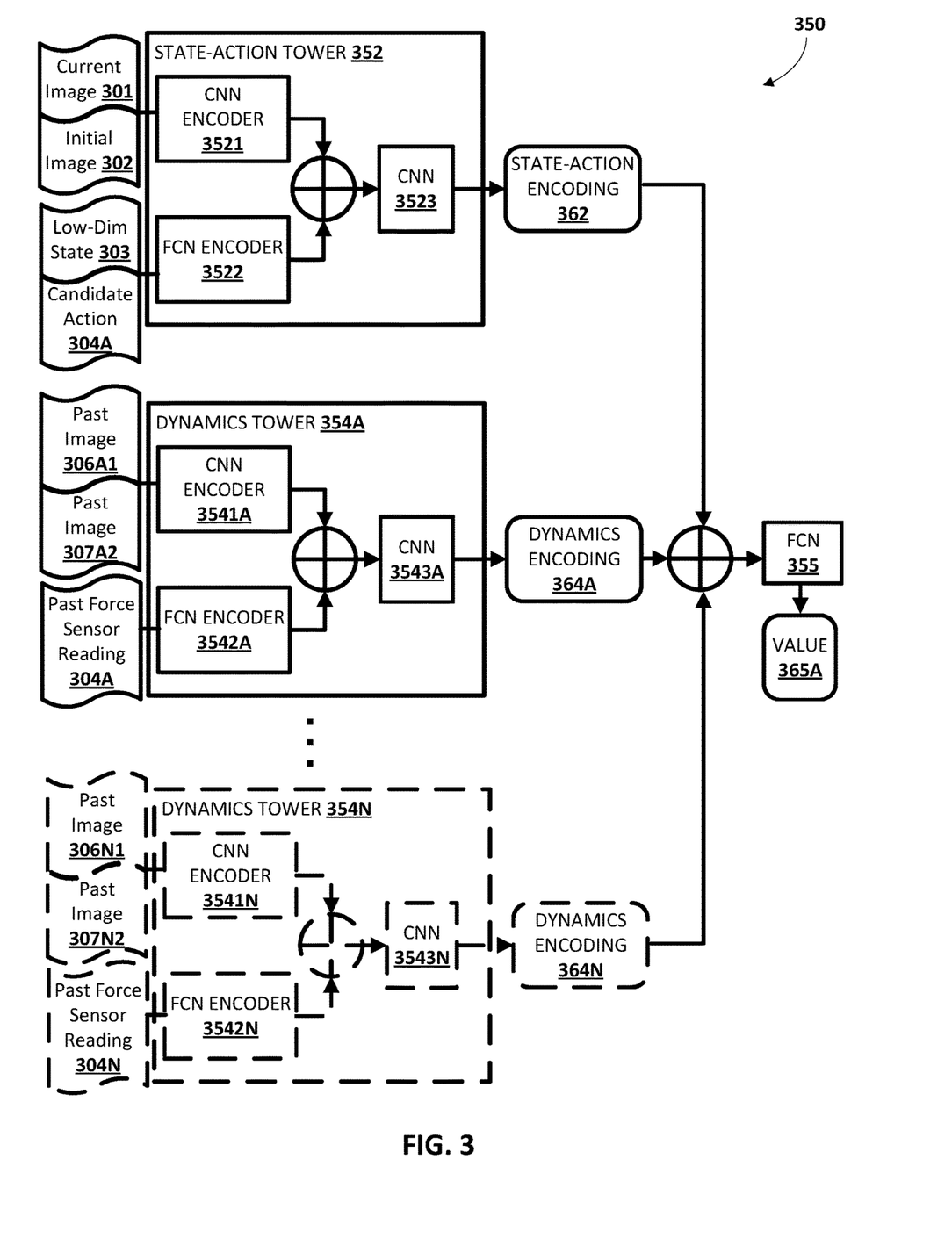
FIG. 3 illustrates an example architecture of a neural network that represents a learned value function.

Turning now to FIG. 3, an example architecture of a neural network model 350 is illustrated. The neural network model 350 represents a learned value function (e.g., a Q-value function learned through reinforcement learning), and is one example of a neural network model that can be utilized in method 200, method 500, or other methods described herein. Also illustrated in FIG. 3 are examples of data that can be processed, using the neural network model 350, to generate a value 365A for a candidate action 304A.

The neural network model 350 includes a state-action tower 352, that includes a convolutional neural network (CNN) encoder 3521, a fully convolutional network (FCN) encoder 3522, and a CNN 3523. A current image 301 and initial image 302 can be processed using the CNN encoder 3521. As described herein, an extra channel can optionally be added, and processed with the images 301 and 302, where the extra channel defines a target position. Low-dimensional current state value(s) 303 and a candidate robotic action 304A can also be processed using the FCN encoder 3522. The values generated from the processing using the CNN encoder 3521 and the processing using the FCN encoder 3522 can be concatenated or otherwise combined, as indicated by the "+", then processed using CNN 3523. The processing using CNN 3523 results in a state-action encoding 362, which is a lower-dimensional encoding of the robot state (as reflected by the images 301 and 302, and the low-dimensional current state value(s) 303) and the action (as reflected by the candidate action 304A).

The neural network model 350 also includes one or more dynamics towers 354A-N, which each have the same architecture and can optionally each have the same learned weights. The dynamics towers 354A-N can also have the same architecture as the state-action tower 352, but will have different learned weights.

Each of the dynamics towers 354A-N is used to generate a corresponding dynamics encoding (e.g., 364A, 364N). For example, two past images 306A1 and 307A2 from a past dynamics sample can be processed using CNN encoder 3541A and a past force sensor reading 304A (e.g., a discretization thereof) can be processed using FCN encoder 3542A. The values generated form the processing using the CNN encoder 3541A and the processing using the FCN encoder 3542A can be concatenated or otherwise combined, as indicated by the "+", then processed using CNN 3543A. The processing using CNN 3543A results in a dynamics encoding 364A, which is a lower-dimensional encoding of the robot-object physics, corresponding to the past images 306A1, 307A2, and past force sensor reading 304A. Also, for example, two past images 306N1 and 307N2 from another past dynamics sample can be processed using CNN encoder 3541N and a past force sensor reading 304N (e.g., a discretization thereof) can be processed using FCN encoder 3542N. The values generated form the processing using the CNN encoder 3541N and the processing using the FCN encoder 3542N can be concatenated or otherwise combined, as indicated by the "+", then processed using CNN 3543N. The processing using CNN 3543N results in a dynamics encoding 364N, which is a lower-dimensional encoding of the robot-object physics, corresponding to the past images 306N1, 307N2, and past force sensor reading 304N. Additional dynamics encodings can optionally be generated, using additional dynamics tower(s), as indicated by the ellipsis in FIG. 3.

The state-action encoding 362 and the dynamics encodings (e.g., 364A and 364N) are concatenated or otherwise combined, as indicated by the "+", then processed using FCN 355. For example, the dynamics encoding 364A, the dynamics encoding 364N, and other optionally generated dynamics encoding(s) can be averaged or otherwise combined. The combined dynamics encoding can be processed, along with the state-action encoding 362, using the FCN 355, to generate the value 365A. The processing using FCN 355 results in a value 365A. The value 365A reflects a probability of manipulation of an object being successful if the candidate robotic action 304A is implemented, and takes into account the state of the robot, as well as past dynamics samples as described herein.

Turning now to FIGS. 4A and 4B, an example of uniform sampling of past dynamics samples is illustrated (FIG. 4A) and an example of contact-aware sampling of past dynamics samples (FIG. 4B). In both FIGS. 4A and 4B, 481 represents a duration of time, during a current episode, in which the second most recent robotic action was being implemented. Further, 482 represents a duration of time, during the current episode, in which the most recent robotic action was being implemented. Yet further, 483 represents a duration of time, in the future and during the current episode, in which a next robotic action will be implemented. In determining the next action to implement at 483, past dynamics samples can be identified and utilized as described herein.

In FIG. 4A, the dynamics samples 471A, 472A, and 473A are identified by utilizing uniform sampling. As illustrated, the dynamics samples 471A, 472A, and 473A are uniformly distributed over time. However, with the uniform distribution of FIG. 4A, one or more of the dynamics samples 471A, 472A, and 473A may be from points in time when the robot was not interacting with the object. For example, it may not have made contact with the object or may have lost contact with the object. As a result, such uniform sampling can, in some situations, result in identification of dynamics samples that are not reflective of robot/object interaction physics.

In FIG. 4B, the dynamics samples 471B, 472B, and 473B are identified by utilizing contact-aware sampling. As described herein, contact-aware sampling can sample from only amongst force sensor readings that satisfy some threshold that indicates contact with an object is likely occurring. Accordingly, with FIG. 4B, the dynamics samples 471B, 472B, and 473B are likely to come from points in time when the robot was interacting with the object. As a result, the dynamics encoding, that can be generated by processing those samples, is more likely to be reflective of the object dynamics.

Figure 5:
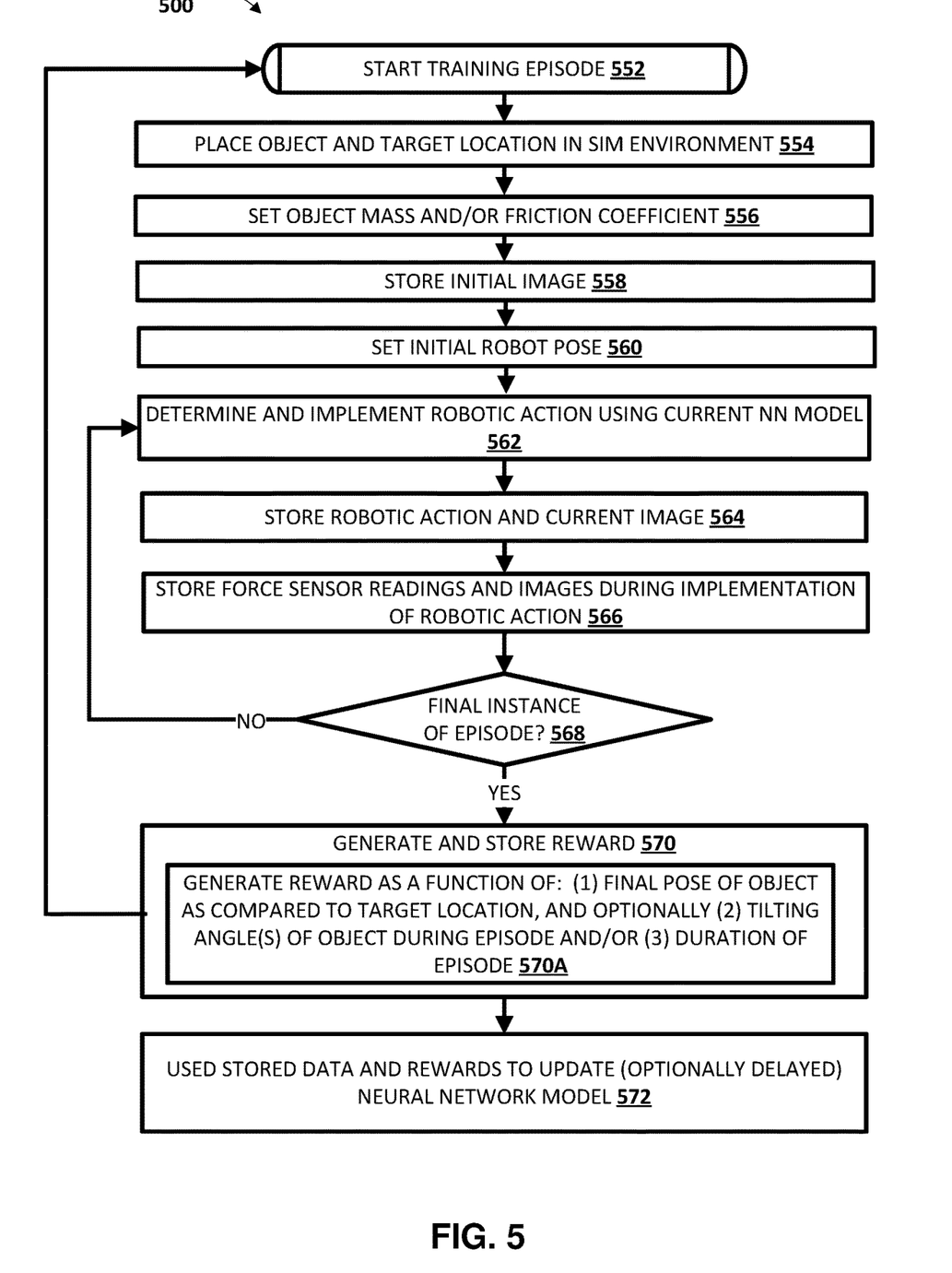
FIG. 5 is a flowchart illustrating an example method of training a neural network, that represents a learned value function for a robotic manipulation, using reinforcement learning.

FIG. 5 is a flowchart illustrating an example method 500 of training a neural network, that represents a learned value function for a robotic manipulation, using reinforcement learning. For convenience, the operations of the flowcharts are described with reference to a system that performs the operations. This system may include one or more components of a robot simulator and/or one or more components of a training engine (e.g., implemented on GPU(s)). Moreover, while operations of method 500 are shown in a particular order, this is not meant to be limiting. One or more operations may be reordered, omitted or added.

At block 552, the system starts a training episode.

At block 554, the system places an object and a target location in a simulated environment of a robot simulator, such as Bullet or other simulator that can model robot object interaction physics. In some implementations, the object can be selected from a corpus of available objects. The placement of the object can optionally be randomly selected, optionally within some constraint(s). The target location can also optionally be randomly selected, optionally within some constraint(s) (e.g., within X distance of the object placement). In some implementations, placing the target location comprises rendering a red dot, or other indicia of the target location, in the simulated environment. In some implementations, placing the target location comprises adding an extra channel to the initial image (e.g., at block 558), where the extra channel reflects the target location.

At block 556, the system sets the object mass and/or the friction coefficient of the object. In some implementations, the mass and/or the friction coefficient can optionally be randomly selected, optionally within some constraint(s). For example, the mass and/or the friction coefficient can be randomly selected from within maximums and/or minimums.

At block 558, the system stores an initial image of the environment. For example, the initial image can be rendered before starting the episode, and can optionally be rendered without any component(s) of the robot in view. The initial image is rendered from the perspective of a simulated vision component of the simulated robot of the simulated environment. The initial image and/or current images that are rendered from simulation can, in some implementations, be further processed using RetinaGAN and/or other approaches to generate synthetic images that look more realistic.

At block 560, the system sets an initial robot pose of the simulated robot, such as a randomly selected initial robot pose.

At block 562, the system determines and implements a robotic action using a current version of the neural network model.

At block 564, the system stores the robotic action that is implemented and a current image rendered right before implementation of the robotic action.

At block 566, the system stores force sensor readings from a simulated force sensor during the implementation of the robotic action. It is noted that multiple force sensor readings can be generated by the simulated force sensor during the implementation of the robotic action. Put another way, the robotic action can take X time steps to implement, and the sensing rate of the simulated force sensor can result in multiple force sensor readings during the X time steps. The sensing rate of the simulated force sensor can be set to be consistent with a real force sensor counterpart of a real robot for which the neural network model is being trained. At block 566, the system also stores images each rendered during a corresponding point in time during the implementation of the robotic action. The images can be rendered from the perspective of a simulated vision component of the simulated robot of the simulated environment. The points in time at which the images are rendered can be based on a capture rate of a real vision component counterpart of a real robot for which the neural network model is being trained. It is noted that the frequency of force sensor readings and the frequency of images can differ. The force sensor readings and images, stored at block 566, can be those from which dynamics samples are generated during reinforcement learning.

At block 568, the system determines whether the most recent implementation of the robotic action is the final instance of implementing a robotic action during the episode. For example, the system can determine the most recent implementation of the robotic action is a final instance if a threshold quantity of instances have been implemented in the episode and/or if a threshold quantity of time has passed in the episode. As another example, the system can determine the most recent implementation of the robotic action is a final instance if, based on simulator data, it is determined the final action resulted in the object reaching the target location or resulted in a failure condition (e.g., the object tipping over). If, at an iteration of block 568, the system determines the most recent implementation of the robotic action is not the final instance of implementing a robotic action during the episode, then the system returns to block 562 to determine and implement another robotic action, and store associated data. If, at an iteration of block 568, the system determines the most recent implementation of the robotic action is the final instance of implementing a robotic action during the episode, then the system proceeds to block 570.

At block 570, the system generates and stores a reward for the episode. In some implementations, block 570 includes sub-block 570A in which the system generates the reward as a function of: (1) a final pose of the object as compared to the target location. The reward can optionally be generated further as a function of (2) tilting angle(s) (e.g., offset of the vertical axis of the object) of the object during one or more point(s) of the episode; and (3) a duration of the episode. For example, the reward function can have a value of 1 when, at the end of the episode, the distance between the simulated object and the target location is less than a threshold and, optionally, when the object is not tipped over at the end of the episode (i.e., the vertical axis of the object is still vertical in the simulated environment).

The system then returns to block 552 and starts another training episode. Optionally, multiple training episodes can occur in parallel, optionally on separate simulators. The system (e.g., separate training worker threads) can also, during training episodes, perform block 572 where the stored data and the rewards, from training episodes, are utilized to update the neural network model. For example, the state-action transitions from the episodes, along with the stored dynamics samples data and the rewards, can be used to update the neural network model using a continuous action variant of Q-learning. Updated weights for the model can occasionally be pushed for updating the "current neural network model" that is used in block 562 of ongoing training episodes. In various implementations, the updating of the neural network model can be based on off-line data, meaning the "current neural network model" that is used in block 562 of ongoing training episodes will be lagged relative to a true most recently updated neural network model.

The paper appended hereto includes additional details on some particular implementations of training the neural network model using reinforcement learning. The paper also includes additional details on some particular implementations of utilization of the neural network model once trained.

Figure 6:
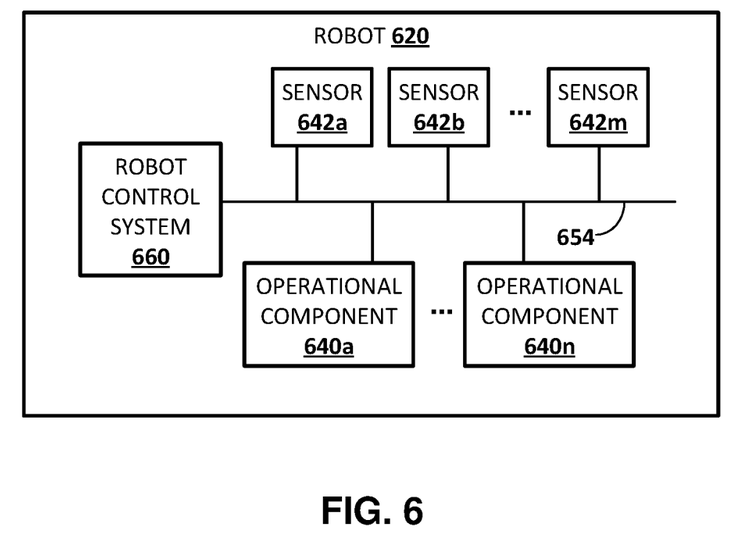
FIG. 6 schematically depicts an example architecture of a robot.

FIG. 6 schematically depicts an example architecture of a robot 620. The robot 620 includes a robot control system 660, one or more operational components 640*a*-640*n*, and one or more sensors 642*a*-642*m*. The sensors 642*a*-642*m* may include, for example, vision sensors, light sensors, pressure sensors, pressure wave sensors (e.g., microphones), proximity sensors, accelerometers, gyroscopes, thermometers, barometers, and so forth. While sensors 642*a*-*m* are depicted as being integral with robot 620, this is not meant to be limiting. In some implementations, sensors 642*a*-*m* may be located external to robot 620, e.g., as standalone units.

Operational components 640*a*-640*n* may include, for example, one or more end effectors and/or one or more servo motors or other actuators to effectuate movement of one or more components of the robot. For example, the robot 620 may have multiple degrees of freedom and each of the actuators may control actuation of the robot 620 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 660 may be implemented in one or more processors, such as a CPU, GPU, and/or other controller(s) of the robot 620. In some implementations, the robot 620 may comprise a "brain box" that may include all or aspects of the control system 660. For example, the brain box may provide real time bursts of data to the operational components 640*a*-*n*, with each of the real time bursts comprising a set of one or more control commands that dictate, inter alio, the parameters of motion (if any) for each of one or more of the operational components 640a-n. In some implementations, the robot control system 660 may perform one or more aspects of method 200 described herein.

As described herein, in some implementations all or aspects of the control commands generated by control system 660 in traversing a robotic component to a particular pose can be based on determining that the robotic action, corresponding to the control commands, are likely to result in successful performance of a manipulation, as determined according to implementations described herein. Although control system 660 is illustrated in FIG. 6 as an integral part of the robot 620, in some implementations, all or aspects of the control system 660 may be implemented in a component that is separate from, but in communication with, robot 620. For example, all or aspects of control system 660 may be implemented on one or more computing devices that are in wired and/or wireless communication with the robot 620, such as computing device 710.

Figure 7:
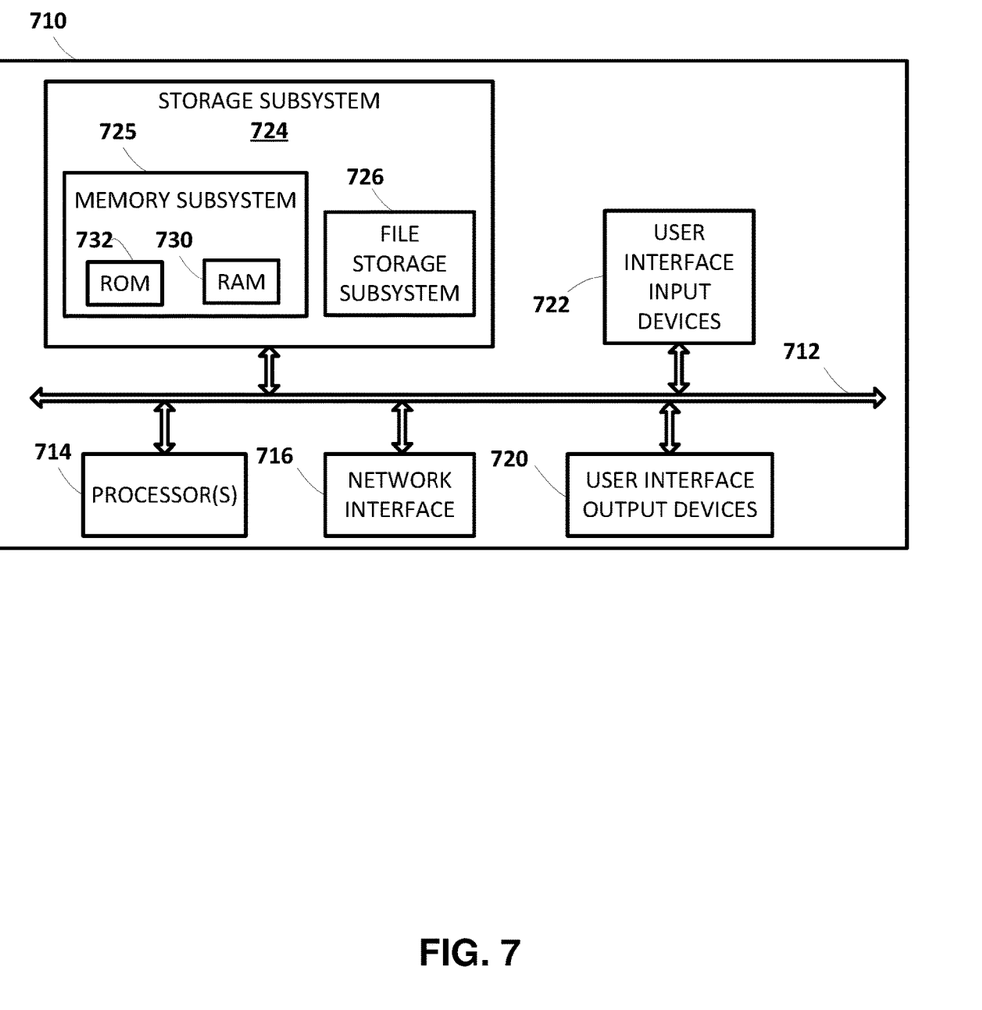
FIG. 7 schematically depicts an example architecture of a computer system.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIG. 2 and/or FIG. 5 (e.g., when a simulator and/or training engine are implemented at least in part on the computing device 710).

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In some implementations, a method implemented by one or more processors of a robot during an episode of manipulation is provided and includes identifying a current image that is based on at least part of a current instance of vision data captured by a vision component of the robot. The method further includes identifying a candidate robotic action to apply to the robot and identifying, from locally stored past data for the episode, one or more past dynamics samples. Each of the past dynamic samples includes at least two associated past images from the episode that are captured in close temporal proximity and that are captured by the vision component. Each of the past dynamic samples also includes an associated past force sensor reading that temporally corresponds to the two associated past images. The method further includes generating a value for the candidate robotic action. The value for the candidate robotic action indicates a probability of the manipulation of the object being successful if the candidate robotic action is implemented. Generating the value includes processing, utilizing a trained neural network that represents a learned value function: the current image, the candidate robotic action, and the one or more past dynamics samples. The method further includes, in response to determining that the value satisfies one or more conditions, controlling the robot to cause the robot to perform the candidate robotic action.

These and other implementations of the technology disclosed herein can include one or more of the following features.

In some implementations, identifying the one or more past dynamics samples includes identifying multiple of the one or more past dynamics samples.

In some implementations, identifying the one or more past dynamics samples includes selecting the one or more past dynamics samples, from a plurality of candidate past dynamics samples, based on determining the associated past force sensor reading of each of the selected one or more past dynamics samples satisfies a threshold. In some versions of those implementations, the associated past force sensor reading of each of the selected one or more past dynamics samples is from a force sensor on an end effector of the robot, or at a connection of the end effector to an additional link of the robot. In some of those versions, the threshold indicates contact between the end effector and the object.

In some implementations, the associated past for sensor reading, of each of the past dynamics samples, is identified based on temporally corresponding to an earlier in time of the two corresponding past images.

In some implementations, the at least two associated past images, of each of the past dynamics samples, are captured within one second, a half second, or other threshold duration of one another. In some implementations, the at least two associated past images, of each of the past dynamics samples, are consecutive images of the vision component.

In some implementations, processing, utilizing the trained neural network: the current image, the candidate robotic action, and the one or more past dynamics samples includes: generating one or more encodings based on processing, using one or more neural network encoding towers, the current image, the candidate robotic action, and the one or more past dynamics samples; and processing the one or more encodings utilizing one or more additional layers to generate the value for the candidate robotic action. In some versions of those implementations, generating the one or more encodings based on processing, using the one or more neural network encoding towers, the current image, the candidate robotic action, and the one or more past dynamics samples, includes: processing the current image and the candidate robotic action using a first neural network encoding tower with first learned weights, to generate a state-action encoding of the one or more encodings; and processing the one or more past dynamics samples using a second neural network encoding tower with second learned weights, to generate one or more dynamics encoding of the one or more encodings. In some of those versions, processing the current image and the candidate robotic action using the first neural network encoding tower to generate the state-action encoding includes: processing the current image using a first tower convolutional neural network encoder, of the first neural network encoding tower, to generate a first tower first encoding; processing the candidate robotic action using a first tower fully convolutional network, of the first neural network encoding tower, to generate a first tower second encoding; and processing a combination of the first tower first encoding and the first tower second encoding, using an additional first tower convolutional neural network encoder, of the first neural network encoding tower, to generate the state-action encoding. In some of those versions, processing the one or more past dynamics samples using a second neural network encoding tower with second learned weights, to generate the one or more dynamics encodings includes, for each of the one or more past dynamics samples, includes: processing the at least two associated images, using a second tower convolutional neural network encoder, of the second neural network encoding tower, to generate a second tower first encoding; processing the associated past force sensor reading using a second tower fully convolutional network, of the second neural network encoding tower, to generate a second tower second encoding; and processing a combination of the second tower first encoding and the second tower second encoding, using an additional second tower convolutional neural network encoder, of the second neural network encoding tower, to generate an associated one of the one or more dynamics encodings.

In some implementations, the method further includes identifying an initial image that is based on at least part of a prior instance of vision data captured by the vision component of the robot, and stacking the initial image with the current image to create a stacked image. In those implementations, the prior instance of vision data is one captured at a beginning of the episode of manipulation and processing the current image includes processing the stacked image.

In some implementations, the candidate robotic action defines a multi-dimensional relative movement of an end effector of the robot, or a multi-dimensional relative target position of the end effector.

In some implementations, the candidate robotic action further defines a torque limit.

In some implementations, the candidate robotic action defines a three-dimensional (3D) translation vector, and two values representing a sine-cosine encoding of the change in orientation of the end effector about an axis of the end effector.

In some implementations, the method further includes identifying an open/closed state of an end effector of the robot. In those implementations, generating the value further includes processing the open/closed state utilizing the trained neural network. The open/closed state can indicate whether digits of the end effector are currently open or are currently closed, or a degree to which the digits are currently opened or currently closed;

In some implementations, the manipulation of the object includes pushing of the object using an end effector of the robot. In some versions of those implementations, the pushing of the object is to a target location and the method further includes modifying the current image, or an initial image processed along with the current image, to define the target location. In some of those versions, modifying the current image, or the initial image, to define the target location includes adding an extra channel that includes a one-hot pixel that defines the current location.

In some implementations, the one or more conditions include the value satisfying a fixed threshold.

In some implementations, a method implemented by one or more processors of a robot during an episode of manipulation is provided and includes identifying a current image that is based on at least part of a current instance of vision data captured by a vision component of the robot. The method further identifying, from locally stored past data for the episode, one or more past dynamics samples. Each of the past dynamic samples includes at least two associated past images from the episode that are captured in close temporal proximity and that are captured by the vision component. Each of the past dynamic samples also includes an associated past force sensor reading that temporally corresponds to the two associated past images. The method further includes determining to implement a robotic action. Determining to implement the robotic action comprises processing, utilizing a trained neural network: the current image and the one or more past dynamics samples. The method further includes, in response to determining to implement the robotic action, controlling the robot to cause the robot to perform the robotic action.

These and other implementations of the technology disclosed herein can include one or more of the following features.

In some implementations, the trained neural network represents a learned value function and determining to implement the robotic action comprises: further processing the robotic action using the trained neural network; generating a value based on processing the current image, the one or more past dynamic samples, and the robotic action using the trained neural network; and determining to implement the robotic action based on the value satisfying a threshold. In some other implementations, the trained neural network is trained to be utilized in directly generating encodings that represent robotic actions. In those implementations, determining to implement the robotic action comprises: generating a given encoding based on processing the current image and the one or more past dynamic samples using the trained neural network; and determining to implement the robotic action based on the given encoding representing the robotic action.

Other implementations can include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described herein. Yet other implementations can include a system of one or more computers and/or one or more robots that include one or more processors operable to execute stored instructions to perform a method such as one or more of the methods described herein.

What is claimed is:

1. A method implemented by one or more processors of a robot during an episode of manipulation of an object by the robot, the method comprising:
    identifying a current image that is based on at least part of a current instance of vision data captured by a vision component of the robot;
    identifying a candidate robotic action to apply to the robot;
    identifying, from locally stored past data for the episode, one or more past dynamics samples, each of the past dynamics sample comprising:
        at least two associated past images from the episode that are captured in close temporal proximity, the two associated past images being captured by the vision component, and
        an associated past force sensor reading temporally corresponding to the two associated past images;
    generating a value for the candidate robotic action, wherein generating the value comprises processing, utilizing a trained neural network that represents a learned value function: the current image, the candidate robotic action, and the one or more past dynamics samples,
        wherein the value for the candidate robotic action indicates a probability of the manipulation of the object being successful if the candidate robotic action is implemented;
    in response to determining that the value satisfies one or more conditions:
        controlling the robot to cause the robot to perform the candidate robotic action.

2. The method of claim 1, wherein identifying the one or more past dynamics samples comprises identifying multiple of the one or more past dynamics samples.

3. The method of claim 1, wherein identifying the one or more past dynamics samples comprises:
    selecting the one or more past dynamics samples, from a plurality of candidate past dynamics samples, based on determining the associated past force sensor reading of each of the selected one or more past dynamics samples satisfies a threshold, the threshold indicating contact between the robot and the object.

4. The method of claim 3, wherein the associated past force sensor reading of each of the selected one or more past dynamics samples is from a force sensor on an end effector of the robot, or at a connection of the end effector to an additional link of a robot, and wherein the threshold indicates contact between the end effector and the object.

5. The method of claim 1, wherein the associated past force sensor reading, of each of the past dynamics samples, is identified based on temporally corresponding to an earlier in time of the two corresponding past images.

6. The method of claim 1, wherein the at least two associated past images, of each of the past dynamics samples, are captured within one second of one another.

7. The method of claim 1, wherein the at least two associated past images, of each of the past dynamics samples, are captured within a half second of one another.

8. The method of claim 1, wherein processing, utilizing the trained neural network: the current image, the candidate robotic action, and the one or more past dynamics samples comprises:
    generating one or more encodings based on processing, using one or more neural network encoding towers, the current image, the candidate robotic action, and the one or more past dynamics samples; and
    processing the one or more encodings utilizing one or more additional layers to generate the value for the candidate robotic action.

9. The method of claim 8, wherein generating the one or more encodings based on processing, using the one or more neural network encoding towers, the current image, the candidate robotic action, and the one or more past dynamics samples, comprises:
    processing the current image and the candidate robotic action using a first neural network encoding tower with first learned weights, to generate a state-action encoding of the one or more encodings; and
    processing the one or more past dynamics samples using a second neural network encoding tower with second learned weights, to generate one or more dynamics encodings of the one or more encodings.

10. The method of claim 9, wherein processing the current image and the candidate robotic action using the first neural network encoding tower to generate the state-action encoding comprises:
    processing the current image using a first tower convolutional neural network encoder, of the first neural network encoding tower, to generate a first tower first encoding;
    processing the candidate robotic action using a first tower fully convolutional network, of the first neural network encoding tower, to generate a first tower second encoding; and
    processing a combination of the first tower first encoding and the first tower second encoding, using an additional first tower convolutional neural network encoder, of the first neural network encoding tower, to generate the state-action encoding.

11. The method of claim 9, wherein processing the one or more past dynamics samples using a second neural network encoding tower with second learned weights, to generate the one or more dynamics encodings comprises, for each of the one or more past dynamics samples, comprises:
    processing the at least two associated images, using a second tower convolutional neural network encoder, of the second neural network encoding tower, to generate a second tower first encoding;
    processing the associated past force sensor reading using a second tower fully convolutional network, of the second neural network encoding tower, to generate a second tower second encoding; and
    processing a combination of the second tower first encoding and the second tower second encoding, using an additional second tower convolutional neural network encoder, of the second neural network encoding tower, to generate an associated one of the one or more dynamics encodings.

12. The method of claim 1, further comprising:
identifying an initial image that is based on at least part of a prior instance of vision data captured by the vision component of the robot, the prior instance of vision data being captured at a beginning of the episode of manipulation; and
stacking the initial image with the current image to create a stacked image;
wherein processing the current image comprises processing the stacked image.

13. The method of claim 1, wherein the candidate robotic action defines a multi-dimensional relative movement of an end effector of the robot, or a multi-dimensional relative target position of the end effector.

14. The method of claim 13, wherein the candidate robotic action further defines a torque limit.

15. The method of claim 13, wherein the candidate robotic action defines a three-dimensional (3D) translation vector, and two values representing a sine-cosine encoding of the change in orientation of the end effector about an axis of the end effector.

16. The method of claim 1, further comprising:
identifying an open/closed state of an end effector of the robot, wherein the open/closed state indicates whether digits of the end effector are currently open or are currently closed, or a degree to which the digits are currently opened or currently closed;
wherein generating the value further comprises processing the open/closed state utilizing the trained neural network.

17. The method of claim 1, wherein the manipulation of the object comprises pushing of the object using an end effector of the robot.

18. The method of claim 17, wherein the pushing of the object is to a target location and the method further includes modifying the current image, or an initial image processed along with the current image, to define the target location.

19. The method of claim 18, wherein modifying the current image, or the initial image, to define the target location comprises adding an extra channel that includes a one-hot pixel that defines the current location.

20. A robot, comprising:
actuators;
a vision component viewing an environment;
a trained neural network model stored in one or more non-transitory computer readable media, the trained neural network model representing a learned value function;
at least one processor executing stored instructions to, during an episode of manipulation of an object by the robot:
identify a current image that is based on at least part of a current instance of vision data captured by the vision component;
identify a candidate robotic action;
identify, from locally stored past data for the episode, one or more past dynamics samples, each of the past dynamics sample comprising:
at least two associated past images from the episode that are captured, by the vision component, in close temporal proximity, and
an associated past force sensor reading temporally corresponding to the two associated past images;
generate a value, for the candidate robotic action, based on processing, utilizing a trained neural network: the current image, the candidate robotic action, and the one or more past dynamics samples,
wherein the value for the candidate robotic action indicates a probability of the manipulation of the object being successful if the candidate robotic action is implemented;
in response to determining that the value satisfies one or more conditions:
provide control commands, to one or more of the actuators, to cause the robot to perform the candidate robotic action.

* * * * *